United States Patent

Nakae et al.

[11] Patent Number: 5,942,594
[45] Date of Patent: Aug. 24, 1999

[54] POLYCARBONATE AND PROCESS FOR PRODUCING THE SAME

[75] Inventors: Mitsugu Nakae; Yasuhiro Ishikawa, both of Sodegaura; Sadayuki Sato, Ichihara, all of Japan

[73] Assignee: Idemitsu Kosan Co., Ltd., Tokyo, Japan

[21] Appl. No.: 09/043,125

[22] PCT Filed: Sep. 18, 1996

[86] PCT No.: PCT/JP96/02675

§ 371 Date: Mar. 19, 1998

§ 102(e) Date: Mar. 19, 1998

[87] PCT Pub. No.: WO97/11107

PCT Pub. Date: Mar. 27, 1997

[30] Foreign Application Priority Data

Sep. 19, 1995 [JP] Japan .................... 7-239481

[51] Int. Cl.⁶ .................................. C08G 64/00
[52] U.S. Cl. .................. 528/196; 528/198; 528/199
[58] Field of Search .................... 528/196, 198, 528/199

*Primary Examiner*—Terressa Mosley
*Attorney, Agent, or Firm*—Oblon, Spivak, McClelland, Maier & Neustadt, P.C.

[57] ABSTRACT

A polycarbonate exhibiting excellent fluidity and moisture resistance and a process for efficiently producing the polycarbonate are provided.

The polycarbonate has a main chain comprising a repeating unit represented by general formula (I):

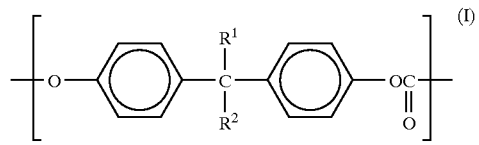

wherein $R^1$ and $R^2$ each represents hydrogen atom or an alkyl group having 1 to 7 carbon atoms; contains 100 ppm by weight or less of a unit of a phenyl salicylate structure expressed by formula (II):

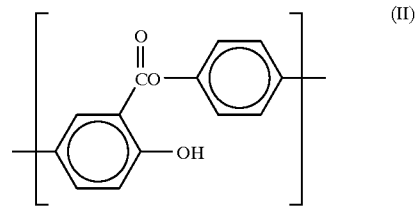

in the main chain; and has a viscosity-average molecular weight of 10,000 or more. The polycarbonate is produced in accordance with a process comprising transesterification in the presence of a catalyst comprising a combination of an organic basic compound containing nitrogen and a quaternary phosphonium salt.

6 Claims, 1 Drawing Sheet

POLYCARBONATE AND PROCESS FOR PRODUCING THE SAME

TECHNICAL FIELD

The present invention relates to a polycarbonate and a process for producing the polycarbonate. More particularly, the present invention relates to a polycarbonate exhibiting excellent fluidity and moisture resistance and a process for efficiently producing the polycarbonate by transesterification in the presence of a specific catalyst.

BACKGROUND ART

Polycarbonates are engineering plastics having excellent impact resistance, heat resistance, and transparency and widely used as various types of mechanical parts, optical disks, and automobile parts. Recently, higher fluidity is required in the field of optical disks.

In response to this requirement, a polycarbonate which is obtained by interfacial polycondensation using a solvent such as methylene chloride and has a chain end structure modified with a group such as cumylphenoxy group has been proposed (Japanese Patent Application Laid-Open No. Heisei 1(1989)-245016). However, complete removal of impurities, such as sodium and chlorine, from the polycarbonate obtained by the interfacial polycondensation is difficult, and the polycarbonate is not satisfactory for optical applications.

On the other hand, as the process for obtaining a polycarbonate containing decreased amounts of impurities without using any solvent, a transesterification process (a melt polymerization process) is known. As the process for producing a polycarbonate having cumylphenoxy group at the chain ends in accordance with this transesterification process, for example, a process in which a catalyst comprising a combination of a basic compound containing nitrogen, an alkali metal compound or an alkaline earth metal compound, and boric acid is used as the polymerization catalyst (Japanese Patent Application Laid-Open No. Heisei 2(1990)-175723) and a process in which polymerization is conducted in the presence of an alkali metal compound or an alkaline earth metal compound used as the catalyst, and then an acidic compound is added (Japanese Patent Application Laid-Open No. Heisei 5(1993)-9287) have been proposed. However, polycarbonates obtained in accordance with these processes have a problem in that cracks are formed at high temperatures in high moisture and strength is decreased.

DISCLOSURE OF THE INVENTION

Under the above circumstances, the present invention has an object to provide a polycarbonate exhibiting excellent fluidity and moisture resistance (resistance to formation of cracks in steam) and a process for producing this polycarbonate efficiently.

As the result of extensive studies by the present inventors on polycarbonates exhibiting excellent fluidity and moisture resistance, it was found that the unit of a phenyl salicylate structure contained in the main chain in a small amount causes decrease in the moisture resistance (resistance to formation of cracks in steam), that a polycarbonate exhibiting excellent moisture resistance can be obtained by suppressing the content of this unit to a specific value or less, and that a polycarbonate satisfying this condition and having p-cumylphenoxy group, phenoxy group, and hydroxyl group in specific relative amounts at the chain ends exhibits particularly excellent fluidity and moisture resistance. It was also found that the above polycarbonates can be obtained efficiently by the transesterification process using a specific catalyst. The present invention has been completed on the basis of these knowledges.

Accordingly, the present invention provides:

(1) A polycarbonate which has a main chain comprising a repeating unit represented by general formula (I):

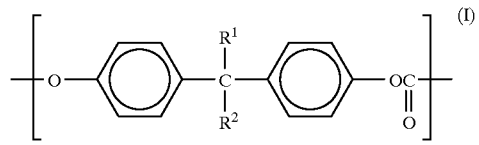

wherein $R^1$ and $R^2$ each represents hydrogen atom or an alkyl group having 1 to 7 carbon atoms, may be the same with or different from each other, and may be bonded to each other to form a ring structure; contains 100 ppm by weight or less of a unit of a phenyl salicylate structure expressed by formula (II):

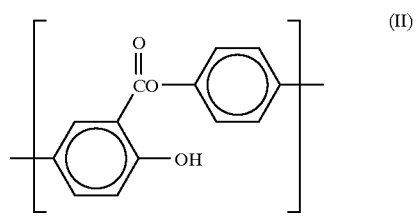

in the main chain; and has a viscosity-average molecular weight of 10,000 or more; and (2) A polycarbonate described in (1), which comprises 5 to 98% by mol of p-cumylphenoxy group, 1 to 94% by mol of phenoxy group, and 1 to 94% by mol of hydroxyl group at the chain ends.

The present invention also provides:

(3) A process for producing a polycarbonate described in (1) which comprises transesterifying (A) an aromatic dihydroxy compound represented by general formula (III):

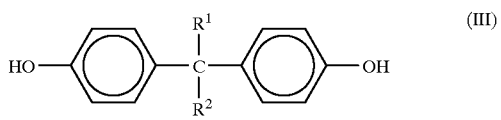

wherein $R^1$ and $R^2$ are the same as the above, with (B) a diester of carbonic acid in the presence of a polymerization catalyst comprising a combination of (a) an organic basic compound containing nitrogen and (b) a quaternary phosphonium salt; and (4) A process for producing a polycarbonate described in (2) which comprises transesterifying (A) an aromatic dihydroxy compound represented by general formula (III) and (B') diphenyl carbonate in the presence of p-cumylphenol and a polymerization catalyst comprising a combination of (a) an organic basic compound containing nitrogen and (b) a quaternary phosphonium salt.

THE MOST PREFERRED EMBODIMENT TO CARRY OUT THE INVENTION

The polycarbonate of the present invention has a main chain comprising a repeating unit represented by general formula (I):

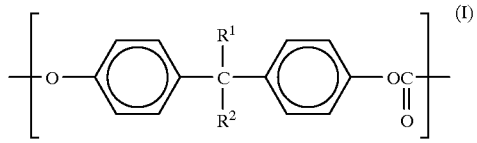

and contains 100 ppm by weight or less of a unit of a phenyl salicylate structure expressed by formula (II):

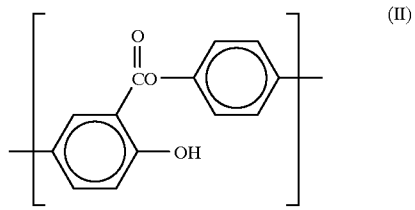

in the main chain.

In general formula (I), $R^1$ and $R^2$ each represents hydrogen atom or an alkyl group having 1 to 7 carbon atoms. The alkyl group may have any of a chain structure, a branched chain structure, and a ring structure. Examples of the alkyl group include methyl group, ethyl group, n-propyl group, isopropyl group, butyl group, pentyl group, hexyl group, heptyl group, cyclopentyl group, and cyclohexyl group. $R^1$ and $R^2$ may be the same with or different from each other and may also be bonded to each other to form a ring structure.

It is necessary that the viscosity-average molecular weight of the polycarbonate be 10,000 or more. When the viscosity-average molecular weight is less than 10,000, mechanical properties are insufficient for practical application. The viscosity-average molecular weight is preferably in the range of 10,000 to 100,000, more preferably 14,000 to 40,000, from the standpoint of the balance between moldability and mechanical properties. The viscosity-average molecular weight (Mv) is obtained by dissolving a polycarbonate in methylene chloride, measuring the intrinsic viscosity $[\eta]$ of the obtained methylene chloride solution at 20° C., and then calculating the viscosity-average molecular weight from the obtained intrinsic viscosity in accordance with the equation:

$$[\eta]=1.23\times10^{-5}\times Mv^{0.83}$$

The unit of the phenyl salicylate structure expressed by formula (II) which is comprised in the main chain of the polycarbonate is considered to be formed by transfer of the carbon atom in the carbonate group to an ortho-position by the effect of heat and a catalyst during polymerization. When the content of this unit exceeds 100 ppm by weight, undesirable phenomena, such as deterioration in moisture resistance, formation of cracks at high temperatures in high moisture, and decrease in impact strength, take place. These phenomena take place particularly markedly when the viscosity-average molecular weight is approximately in the range of 14,000 to 17,000, i.e., when the most advantageous balance between fluidity and strength for practical molded articles is exhibited. The content of the unit of the phenyl salicylate structure is measured in accordance with the following method.

A polymer in an amount of 500 mg is dissolved in 25 ml of methylene chloride, and light absorbance of the obtained solution at 320 nm is measured. As the reference solution, a solution is prepared by dissolving flakes of a polycarbonate prepared in accordance with the interfacial polycondensation (manufactured by IDEMITSU PETROCHEMICAL Co., Ltd.) in methylene chloride in the same manner as the above.

A calibration curve is separately prepared by using phenyl salicylate as the reference material. The content (ppm by weight) of the unit of the phenyl salicylate structure in the polymer is obtained from the prepared calibration curve and the light absorbance obtained above.

As the process for producing the polycarbonate of the present invention, any process can be used as long as the polycarbonate exhibiting the above properties can be obtained, and the process is not particularly limited. Among such processes, a process for producing the polycarbonate by transesterification is advantageous.

In accordance with the process of the present invention, the desired polycarbonate can be efficiently produced by transesterifying (A) an aromatic dihydroxy compound represented by general formula (III):

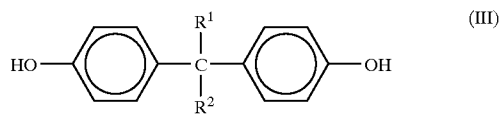

wherein $R^1$ and $R^2$ are the same as the above, with (B) a diester of carbonic acid in the presence of a polymerization catalyst comprising a combination of (a) an organic basic compound containing nitrogen and (b) a quaternary phosphonium salt.

Examples of the aromatic dihydroxy compound represented by general formula (III) of component (A) described above include bis(4-hydroxyphenyl)methane, 1,1-bis(4-hydroxyphenyl)ethane, 1,1-bis(4-hydroxyphenyl)propane, 2,2-bis(4-hydroxyphenyl)propane (so-called bisphenol A), 1,1-bis(4-hydroxyphenyl)butane, 1,1-bis(4-hydroxyphenyl) isobutane, 2,2-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2-bis(4-hydroxyphenyl)hexane, 3,3-bis(4-hydroxyphenyl)hexane, 2,2-bis(4-hydroxyphenyl)heptane, 3,3-bis(4-hydroxyphenyl)heptane, 4,4-bis(4-hydroxyphenyl)heptane, 2,2-bis(4-hydroxyphenyl)octane, 3,3-bis(4-hydroxyphenyl) octane, 4,4-bis(4-hydroxyphenyl)octane, 1,1-bis(4-hydroxyphenyl)cyclopentane, and 1,1-bis(4-hydroxyphenyl)cyclohexane.

The aromatic dihydroxy compound of component (A) may be used singly or as a combination of two or more types. Among these compounds, bisphenol A is particularly preferably used.

As the diester of carbonic acid used as component (B) in the present invention, various compounds can be used. For example, at least one type of compound selected from the group consisting of diaryl carbonate compounds, dialkyl carbonate compounds, and alkylaryl carbonate compounds can be used.

The diaryl carbonate compound used as component (B) is a compound represented by general formula (IV):

(IV)

wherein Ar¹ and Ar² each represents an aryl group and may be the same with or different from each other, or a compound represented by general formula (V)

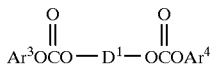
(V)

wherein Ar³ and Ar⁴ each represents an aryl group and may be the same with or different from each other, and D¹ represents a residue group obtained by removing two hydroxyl groups from the above aromatic dihydroxy compound.

The dialkyl carbonate compound is a compound represented by general formula (VI):

(VI)

wherein R³ and R⁴ each represents an alkyl group having 1 to 6 carbon atoms or a cycloalkyl group having 4 to 7 carbon atoms and may be the same with or different from each other, or a compound represented by general formula (VII):

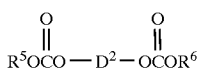
(VII)

wherein R⁵ and R⁶ each represents an alkyl group having 1 to 6 carbon atoms or a cycloalkyl group having 4 to 7 carbon atoms and may be the same with or different from each other, and D² represents a residue group obtained by removing two hydroxyl groups from the above aromatic dihydroxy compound.

The alkylaryl carbonate compound is a compound represented by general formula (VIII):

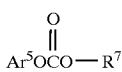
(VIII)

wherein Ar⁵ represents an aryl group and R⁷ represents an alkyl group having 1 to 6 carbon atoms or a cycloalkyl group having 4 to 7 carbon atoms, or a compound represented by general formula (IX):

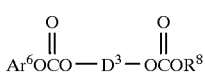
(IX)

wherein Ar⁶ represents an aryl group and R⁸ represents an alkyl group having 1 to 6 carbon atoms or a cycloalkyl group having 4 to 7 carbon atoms, and D³ represents a residue group obtained by removing two hydroxyl groups from the above aromatic dihydroxy compound.

Examples of the diaryl carbonate compound include diphenyl carbonate, ditolyl carbonate, bis(chlorophenyl) carbonate, m-cresyl carbonate, dinaphthyl carbonate, bis(diphenyl) carbonate, and bisphenol A bisphenyl carbonate.

Examples of the dialkyl carbonate compound include diethyl carbonate, dimethyl carbonate, dibutyl carbonate, dicyclohexyl carbonate, and bisphenol A bismethyl carbonate.

Examples of the alkylaryl carbonate compound include methyl phenyl carbonate, ethyl phenyl carbonate, butyl phenyl carbonate, cyclohexyl phenyl carbonate, and bisphenol A methyl phenyl carbonate.

In the present invention, one or more types of compound are suitably selected from the above compounds and used as the diester of carbonic acid of component (B). Among these compounds, diphenyl carbonate is preferably used.

In the process of the present invention, a chain stopper may be used, where necessary. Examples of the chain stopper include phenol, o-n-butylphenol, m-n-butylphenol, p-n-butylphenol, o-isobutylphenol, m-isobutylphenol, p-isobutylphenol, o-t-butylphenol, m-t-butyl phenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-tbutylphenol, 2,4-di-t-butylphenol, 3,5-di-t-butylphenol, 2,5-dicumylphenol, 3,5-dicumylphenol, compounds expressed by the following formulae:

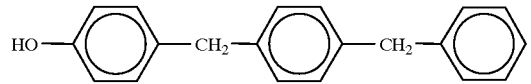

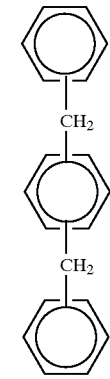

monohydric phenols, such as chroman derivatives expressed by the following formulae:

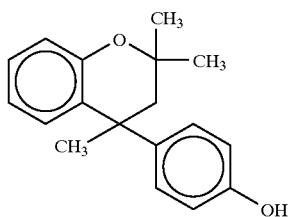

-continued

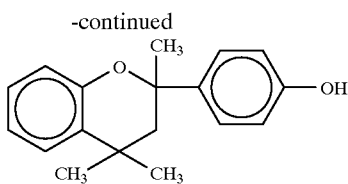

compounds represented by the following formulae:

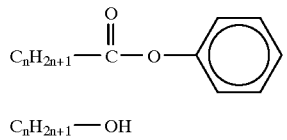

wherein n represents an integer of 7 to 30, and compounds represented by the following formulae:

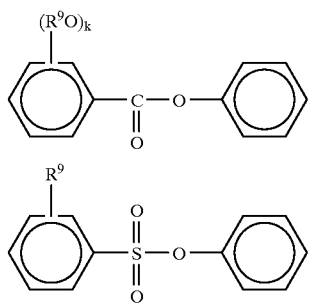

wherein $R^9$ represents an alkyl group having 1 to 12 carbon atoms, and k represents an integer of 1 to 3.

Among these compounds, phenol, p-t-butylphenol, p-cumylphenol, and p-phenylphenol are preferably used. p-Cumylphenol is more preferable from the standpoint of fluidity of the obtained polycarbonate.

In the present invention, compounds such as phloroglucinol, trimellitic acid, 1,1,1-tris(4-hydroxyphenyl) ethane, 1-[α-methyl-α-(4'-hydroxyphenyl)ethyl]-4-[α',α'-bis(4"-hydroxyphenyl)ethyl]benzene, α,α',α"-tris(4-hydroxyphenyl)-1,3,5-triisopropylbenzene, and isatin bis(o-cresol) can be used as the branching agent.

In the process of the present invention, a combination of (a) an organic basic compound containing nitrogen and (b) a quaternary phosphonium salt is used as the polymerization catalyst in the transesterification.

The organic basic compound containing nitrogen of component (a) described above is not particularly limited, and various compounds can be used. Examples of the organic basic compound containing nitrogen include aliphatic tertiary amine compounds, such as trimethylamine, triethylamine, tripropylamine, tributylamine, tripentylamine, trihexylamine, and dimethylbenzylamine; aromatic tertiary amine compounds, such as triphenylamine; and heterocyclic compounds containing nitrogen, such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylaminoimidazole, 2-methoxyimidazole, 2-mercaptoimidazole, aminoquinoline, and diazabicyclooctane (DABCO).

Further examples include quaternary ammonium salts represented by general formula (X):

$$(NR^{10}_4)^+(X^1)^- \tag{X}$$

In general formula (X) shown above, $R^{10}$ represents an organic group. Examples of the organic group include alkyl groups and cycloalkyl groups, such as methyl group, ethyl group, propyl group, butyl group, pentyl group, hexyl group, octyl group, and cyclohexyl group; aryl groups, such as phenyl group, tolyl group, naphthyl group, and biphenyl group; and arylalkyl groups, such as benzyl group. The four groups represented by $R^{10}$ may be the same with or different from each other, and two groups represented by $R^{10}$ may be bonded to each other to form a ring structure. $X^1$ represents a halogen atom, hydroxyl group, or $BR_4$, wherein R represents hydrogen atom or a hydrocarbon group, such as an alkyl group and an aryl group, and the four groups represented by R may be the same with or different from each other.

Examples of the quaternary ammonium salt include ammonium hydroxides having alkyl groups, aryl groups, and alkaryl group, such as tetramethylammonium hydroxide, tetraethylammonium hydroxide, tetrabutylammonium hydroxide, and trimethylbenzylammonium hydroxide; and basic salts, such as tetramethylammonium borohydride, tetrabutylammonium borohydride, tetrabutylammonium tetraphenylborate, and tetramethylammonium tetraphenylborate.

Among these organic basic compounds containing nitrogen, the quaternary ammonium salts represented by general formula (X) shown above, specifically, tetramethylammonium hydroxide, tetrabutylammonium hydroxide, tetramethylammonium borohydride, and tetrabutylammonium borohydride, are preferable because of high catalyst activity and easiness of heat decomposition which gives a smaller amount of residues left in the polymer. Tetramethylammonium hydroxide is more preferable among these compounds.

The organic basic compound containing nitrogen of component (a) may be used singly or as a combination of two or more types.

The quaternary phosphonium salt of component (b) is not particularly limited, and various compounds can be used. For example, compounds represented by general formula (XI):

$$(PR^{11}_4)^+(X^2)^- \tag{XI}$$

are preferably used.

In general formula (XI) shown above, $R^{11}$ represents an organic group. Examples of the organic group include the same groups as those shown above as examples of the group represented by $R^{10}$ in general formula (X). The four groups represented by $R^{11}$ may be the same with or different from each other, and two groups represented by $R^{11}$ may be bonded to each other to form a ring structure. $X^2$ represents a halogen atom, hydroxyl group, an alkyloxy group, an aryloxy group, $(R'O)_2P(=O)O$, or $BR''_4$. In these formulae, R' represents a hydrocarbon group, such as an alkyl group and an aryl group, and two groups represented by R'O may be the same with or different from each other. R" represents hydrogen atom or a hydrocarbon group, such as an alkyl group and an aryl group, and the four groups represented by R" may be the same with or different from each other.

Examples of the quaternary phosphonium salt include tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, and tetrabutylphosphonium hydroxide; tetramethylphosphonium tetraphenylborate; tetraphenylphosphonium bromide; tetraphenylphosphonium tetraphenylborate; methyltriphenylphosphonium tetraphenylborate; benzyltriphenylphosphonium tetraphenylborate; tetratolylphosphonium tetraphenylborate; tetraphenylphosphonium phenolate; tetra(p-t-butylphenyl)phosphonium diphenylphosphate; triphenylbutylphosphonium phenolate; and triphenylbutylphosphonium tetraphenylborate.

Examples other than the compounds represented by general formula (XI) shown above include bis-tetraphenylphosphonium salt of 2,2-bis(4-hydroxyphenyl)propane, ethylenebis(triphenylphosphonium) dibromide, and trimethylenebis(triphenylphosphonium) bis(tetraphenylborate).

Among these quaternary phosphonium salts, tetraphenylphosphonium tetraphenylborate, methyltriphenylphosphonium tetraphenylborate, and benzyltriphenylphosphonium tetraphenylborate are preferable because of high catalyst activity and easiness of heat decomposition which gives a smaller amount of residues left in the polymer.

The quaternary ammonium salt of component (a) may be used singly or as a combination of two or more types.

It is preferable that the organic basic compound containing nitrogen and the quaternary ammonium salts contain metal impurities in amounts as small as possible. It is particularly preferable that the contents of compounds of alkali metals and alkaline earth metals are 50 ppm or less.

In the process of the present invention, it is preferable that the organic basic compound containing nitrogen of component (a) described above is used as the catalyst component in an amount of $10^{-1}$ to $10^{-6}$ mol, more preferably $10^{-2}$ to $10^{-5}$ mol, and the quaternary phosphonium salt of component (b) described above is used as the catalyst component in an amount of $10^{-3}$ to $10^{-8}$ mol, preferably $10^{-4}$ to $10^{-7}$ mol. When the amount of component (a) is less than $10^{-6}$ mol, the catalyst activity in the initial period of the reaction is insufficient. When the amount of component (a) exceeds $10^{-1}$ mol, the cost of production is increased. When the amount of component (b) is less than $10^{-8}$ mol, the catalyst activity in the later period of the reaction is insufficient. When the amount of component (b) exceeds $10^{-3}$ mol, the cost of production is increased. Therefore, such amounts are not preferable.

This polymerization catalyst is used in such an amount that the total of the amounts of components (a) and (b) is generally $10^{-1}$ to $10^{-8}$ mol, preferably $10^{-2}$ to $10^{-7}$ mol, per 1 mol of the aromatic dihydroxy compound of component (A) used as a raw material. When the amount of the catalyst is less than $10^{-8}$ mol, there is the possibility that the catalyst activity is not exhibited. When the amount of the catalyst exceeds $10^{-1}$ mol, there is the possibility that physical properties, particularly heat resistance and hydrolytic resistance, of the polycarbonate obtained as the final product are decreased, and the cost of production is increased. Therefore, an amount exceeding the above range is not preferable.

As the polycarbonate of the present invention, a polycarbonate containing 100 ppm or less of the unit of the phenyl salicylate structure expressed by formula (II) shown above and comprising 5 to 98% by mol of p-cumylphenoxy group, 1 to 94% by mol of phenoxy group, and 1 to 94% by mol of hydroxyl group at the chain ends is preferable because excellent fluidity and moisture resistance are exhibited.

The above polycarbonate can be produced efficiently by transesterification of (A) the aromatic dihydroxy compound represented by general formula (III) shown above with (B') diphenyl carbonate in the presence of p-cumylphenol used as the chain stopper and a polymerization catalyst comprising a combination of the organic basic compound containing nitrogen of component (a) described above and the quaternary phosphonium salt of component (b) described above.

In the present invention, the total amount of the chain stopper may be added to the reaction system in advance; alternatively, a portion of the chain stopper may be added to the reaction system in advance, and the remaining portion may be added in accordance with the progress of the reaction; or, where desired, the total amount of the chain stopper may be added to the reaction system after transesterification of the aromatic dihydroxy compound of component (A) with the diester of carbonic acid of component (B) has partially proceeded. When p-cumylphenol is used as the chain stopper, p-cumylphenol is used in an amount preferably in the range of 0.01 to 0.2 mol, more preferably in the range of 0.02 to 0.15 mol, most preferably in the range of 0.02 to 0.1 mol, per 1 mol of the aromatic dihydroxy compound.

When the transesterification is conducted in accordance with the process of the present invention, the reaction temperature is not particularly limited. The reaction temperature is selected generally in the range of 100 to 330° C., preferably 180 to 300° C. It is more preferable that the reaction temperature is increased gradually from 180° C. to 300° C. in accordance with the progress of the reaction. When the temperature of the transesterification is lower than 100° C., the rate of the reaction is small. When the temperature exceeds 330° C., problems arise in that side reactions take place and that the obtained polymer is colored. Therefore, such amounts are not preferable. The reaction pressure is set in accordance with the vapor pressure of the monomers and the reaction temperature. In other words, the pressure can be set at a value suitable for achieving an efficient reaction and is not particularly limited. In many cases, the pressure is generally set at an atmospheric pressure (an ordinary pressure) or an added pressure, i.e., in the range of 1 to 50 atom (760 to 38,000 torr), in the initial period of the reaction, and at a reduced pressure in the later period of the reaction, preferably in the range of 0.01 to 100 torr in the final stage of the reaction.

As for the reaction time, the reaction can be continued until the object molecular weight is achieved. The reaction time is generally about 0.2 to 10 hours.

The above transesterification is generally conducted in the absence of an inert solvent. The reaction may also be conducted in the presence of an inert solvent in an amount of 1 to 150% by weight of the obtained polycarbonate, where necessary. Examples of the inert solvent include aromatic compounds, such as diphenyl ether, halogenated diphenyl ethers, benzophenone, polyphenyl ethers, dichlorobenzene, and methylnaphthalene; and cycloalkanes, such as tricyclo(5,2,10)decane, cyclooctane, and cyclodecane. The reaction may be conducted in an atmosphere of an inert gas, where necessary. Examples of the inert gas include various types of gas, such as argon, carbon dioxide, nitrogen monoxide, and nitrogen; chlorofluorohydrocarbons; and alkanes, such as ethane and propane.

In the present invention, an antioxidant may be added to the reaction system, where necessary. As the antioxidant, antioxidants containing phosphorus are preferable. Examples of such antioxidants include trialkyl phosphites, such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl) phosphite, and tris(2,3-dichloropropyl) phosphite; tricycloalkyl phosphites, such as tricyclohexyl phosphite; triaryl phosphites, such as triphenyl phosphite, tricresyl phosphite, tris(ethylphenyl) phosphite, tris(butylphenyl) phosphite, tris(nonylphenyl) phosphite, and tris(hydroxyphenyl) phosphite; monoalkyl diaryl phosphites, such as 2-ethylhexyl diphenyl phosphite; trialkyl phosphates, such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl) phosphate; tricycloalkyl phosphates, such as tricyclohexyl phosphate; and triaryl phosphates, such as triphenyl phosphate, tricresyl phosphate, tris(nonylphenyl) phosphate, and 2-ethylphenyl diphenyl phosphate.

In the present invention, phenols and alcohols which correspond to the used diester of carbonic acid, esters of these compounds, and the inert solvent leave the reactor as the reaction proceeds. The substances leaving the reactor can be recycled after separation and purification. Therefore, it is preferable that an apparatus to remove these substances is attached to the reactor.

The reaction can be conducted in accordance with a batch process or a continuous process. Any desired apparatus can be used for the reaction. When the reaction is conducted in accordance with a continuous process, it is preferable that at least two reactors are used and the reaction conditions are set as described above.

The material and the structure of the reactor used in the present invention is not particularly limited as long as the reactor has an ordinary ability of stirring. It is preferable that the reactor has ability of stirring in a high viscosity condition because viscosity of the reaction system is increased in the later stage of the reaction. The reactor is not limited to a tank reactor, but reactors of other shapes, such as an extruder-type reactor, can also be used.

In the present invention, it is preferable that, after the transesterification has been completed, the reaction product is heat treated at a temperature above the decomposition temperature of the catalyst, preferably at about 300° C., and the catalyst is removed by heat decomposition to improve the quality (color) of the obtained polycarbonate.

The thus obtained polycarbonate may be directly formed into granules or molded by using an extruder.

The polycarbonate obtained in accordance with the present invention may be used after being mixed with conventional additives, such as plasticizers, pigments, lubricants, mold release agents, stabilizers, and inorganic fillers.

It is also possible that the polycarbonate is blended with other polymers, such as polyolefins, polystyrenes, polysulfonates, polyamides, and polyphenylene ethers. It is particularly effective that the polycarbonate is used in combination with polymers, such as polyphenylene ethers, polyether nitrites, polysiloxane compounds modified at the chain ends, modified polypropylenes, and modified polystyrenes, which have OH group, COOH group, $NH_2$ group, or the like at the chain ends.

EXAMPLES

The present invention is described in more detail with reference to examples and comparative examples in the following. However, the present invention is not limited by the examples.

Example 1

Into an autoclave having an inner volume of 1.4 liter, made of nickel steel, and equipped with a stirrer, 228 g (1.00 mol) of bisphenol A (BPA), 226.8 g (1.06 g) of diphenyl carbonate, and 6.1 g (0.029 mol) of p-cumylphenol were placed, and then a 20% by weight aqueous solution of tetramethylammonium hydroxide (TMAH) (Na<1 ppb, Ca<1 ppb, and K<1 ppb) and a 40% by weight aqueous solution of tetrabutylphosphonium hydroxide (TBPH) (Na<40 ppm and K<5 ppm) were added as the catalyst in such amounts that the concentration of TMAH was $2.5 \times 10^{-4}$ mol/mol BPA and the concentration of TBPH was $1 \times 10^{-5}$ mol/mol BPA. The autoclave was purged with nitrogen five times.

After the resultant mixture was heated to 180° C. to melt bisphenol A and diphenyl carbonate, the mixture was stirred for 30 minutes. Then, the temperature was increased to 210° C., and the pressure was reduced to 100 mm Hg. Phenol formed in the mixture was removed by distillation. When the rate of distillation of phenol decreased, the temperature was increased to 240° C., and distillation of phenol was continued. Then, the pressure was further decreased to 10 mm Hg, and the reaction was allowed to proceed for 1 hour. Subsequently, the temperature was increased to 270° C., and the pressure was decreased gradually to 0.4 mm Hg. The reaction was allowed to proceed in this condition for 60 minutes.

A viscous transparent condensate in the autoclave was taken out, and properties of the thus obtained polycarbonate were measured in accordance with the following methods. The amount of p-cumylphenol and the type and the amount of the catalyst are shown in Table 1, and the results are shown in Table 2.

(1) Content of the unit of the phenyl salicylate structure

The content of the unit of the phenyl salicylate structure in the main chain was obtained in accordance with the method described above.

(2) Mol fractions of chain end structures

Mole fractions of p-cumylphenoxy group, phenoxy group, and hydroxyl group at the chain ends were obtained by $^1$H-NMR.

(3) Viscosity-average molecular weight

The viscosity-average molecular weight (Mv) was obtained in accordance with the method described above.

(4) Number of formed cracks

A polycarbonate was molded into a sample of a size of 5×5 cm and a thickness of 3 mm by pressing at 280° C. After the obtained sample was exposed to steam in a sterilizing chamber at 121° C. for 48 hours, the sample was kept in water. After 24 hours, the number of formed cracks per a plate of 5×5 cm was measured in accordance with the following method. A magnified projection picture (10 times) was taken by a universal projector (OLYMPUS UP-350) using a monochromatic filter. The obtained picture was analyzed by a scanner set at 25 cm×20 cm using an image analyzer (IMAGE ANALYSIS SYSTEM V2.0, manufactured by STANLEY ELECTRIC Co., Ltd.). The obtained image was converted into binary data in accordance with the discrimination analysis. The number of particles having 10 or more picture elements (1 picture element=0.3 mm) was counted. Five times the value obtained by the measurement was used as the number of formed cracks.

(5) Flowability

The amount (ml/sec) of a resin flowing out of a nozzle having a diameter of 1 mm and a length of 10 mm was measured at 280° C. under a pressure of 160 kg/cm$^2$, and the obtained value was used as the flowability.

(6) Qualitative analysis of the phenyl salicylate structure

A polymer in an amount of 500 mg was dissolved in methylene chloride and hydrolyzed with a 2 N KOHmethanol solution. After the hydrolysis, methylene chloride was vaporized. The residual product was neutralized with hydrochloric acid and separated into fractions by using a high performance liquid chromatography. A fraction having the maximum absorption at about 310 nm (the maximum absorption generally shifts from 320 nm to 308 nm because the phenyl salicylate structure is in the form of the methyl ester) is taken, and the mass spectrum of the fraction was obtained by a mass spectrometer. The mass spectrum is shown in FIG. 1.

The reaction taking place in the hydrolysis is shown in the following:

and that tetraphenylphosphonium tetraphenylborate (TPTB; Na<1 ppm and Mg<1 ppm) was used as the catalyst component in an amount of $1 \times 10^{-5}$ mol/mol BPA in place of the aqueous solution of TBPH.

Comparative Example 1

The same procedures as those conducted in Example 1 were conducted except that compounds shown in Table 1 were used as the catalyst, and that butyl p-toluenesulfonate was added in an amount of 1.8 ppm by weight of the polymer after the polymerization was completed and a

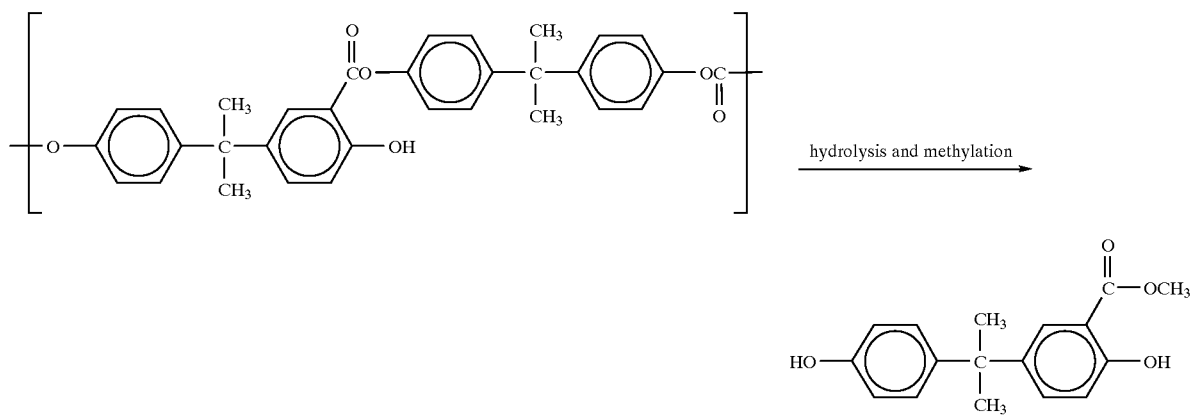

Example 2

The same procedures as those conducted in Example 1 were conducted except that methyltriphenylphosphonium tetraphenylborate (MTPTB; Na<7 ppm and Mg<5 ppm) in an amount of $1 \times 10^{-5}$ mol/mol BPA was used in place of TBPH. The amount of p-cumylphenol and the type and the amount of the catalyst are shown in Table 1, and the results are shown in Table 2.

Example 3

The same procedures as those conducted in Example 1 were conducted except that 4.1 g (0.02 mol) of p-cumylphenol was used, and that, as the catalyst components, tetrabutylammonium hydroxide (TBAH; Na<5 ppm and K<10 ppm) was used in an amount of $2.5 \times 10^{-4}$ mol/mol BPA and tetraphenylphosphonium tetraphenylborate (TPTB; Na<1 ppm and Mg<1 ppm) was used in an amount of $1 \times 10^{-5}$ mol/mol BPA. The amount of p-cumylphenol and the type and the amount of the catalyst are shown in Table 1, and the results are shown in Table 2.

Example 4

The same procedures as those conducted in Example 1 were conducted except that p-cumylphenol was added after the temperature was increased to 240° C. The amount of p-cumylphenol and the type and the amount of the catalyst are shown in Table 1, and the results are shown in Table 2.

Example 5

The same procedures as those conducted in Example 1 were conducted except that p-cumylphenol was not used, melted product was taken out after the resultant mixture was stirred for 30 minutes. The results are shown in Table 2.

Comparative Example 2

The same procedures as those conducted in Example 1 were conducted except that the compounds shown in Table 1 were used as the catalyst, and that butyl p-toluenesulfonate was added in an amount of 10 ppm by weight of the polymer after the polymerization was completed and a melted product was taken out after the resultant mixture was stirred for 30 minutes. The results are shown in Table 2.

Comparative Example 3

The same procedures as those conducted in Example 3 were conducted except that the compounds shown in Table 1 were used as the catalyst. The results are shown in Table 2.

Comparative Example 4

The same procedures as those conducted in Example 3 were conducted except that the compounds shown in Table 1 were used as the catalyst. The results are shown in Table 2.

TABLE 1

| | amount of p-cumyl-phenol (mol) | polymerization catalyst | | | |
|---|---|---|---|---|---|
| | | compound I | | compound II | |
| | | type | amount (mol/mol BPA) | type | amount (mol/mol BPA) |
| Example 1 | 0.029 | TMAH | $2.5 \times 10^{-4}$ | TBPH | $1 \times 10^{-5}$ |
| Example 2 | 0.029 | TMAH | $2.5 \times 10^{-4}$ | MTPTB | $1 \times 10^{-5}$ |
| Example 3 | 0.029 | TBAH | $2.5 \times 10^{-4}$ | TPTB | $1 \times 10^{-5}$ |
| Example 4 | 0.029 | TMAH | $2.5 \times 10^{-4}$ | TBPH | $1 \times 10^{-5}$ |
| Example 5 | 0.000 | TMAH | $2.5 \times 10^{-4}$ | TPTB | $1 \times 10^{-5}$ |
| Comparative Example 1 | 0.029 | TMAH | $2.5 \times 10^{-4}$ | NaOH | $1 \times 10^{-6}$ |
| Comparative Example 2 | 0.029 | TMAH | $2.5 \times 10^{-4}$ | $(CH_3COO)_2Ca$ | $2 \times 10^{-6}$ |
| Comparative Example 3 | 0.02 | TBAH | $2.5 \times 10^{-4}$ | NaOH | $1 \times 10^{-6}$ |
| Comparative Example 4 | 0.02 | TMAH | $2.5 \times 10^{-4}$ | — | — |

Notes:
TMAH: A 20% by weight aqueous solution of tetramethylammonium hydroxide (Na < 1 ppb, Ca < 1 ppb, K < 1 ppb)
TBAH: Tetrabutylammonium hydroxide (Na < 5 ppm, K < 10 ppm)
TBPH: A 40% by weight aqueous solution of tetrabutylphosphonium hydroxide (Na < 40 ppm, K < 5 ppm)
MTPTB: Methyltriphenylphosphonium tetraphenylborate (Na < 7 ppm, Mg < 5 ppm)
TPTB: Tetraphenylphosphonium tetraphenylborate (Na < 1 ppm, Mg < 1 ppm)

TABLE 2-1

| | viscosity-average molecular weight [Mv] | content of unit of phenyl salicylate structure (ppm by wt.) | flowability ($\times 10^{-2}$ml/sec) | number of formed cracks |
|---|---|---|---|---|
| Example 1 | 15,500 | 30 | 35 | 0 |
| Example 2 | 15,300 | 20 | 26 | 0 |
| Example 3 | 17,000 | 20 | 24 | 0 |
| Example 4 | 16,100 | 20 | 29 | 0 |
| Example 5 | 15,700 | 20 | 26 | 130 |
| Comparative Example 1 | 15,800 | 150 | 34 | 400 |
| Comparative Example 2 | 15,100 | 170 | 37 | 600 |
| Comparative Example 3 | 16,800 | 140 | 34 | whitened |
| Comparative Example 4 | 5,600 | 20 | no high molecular weight polymer formed | |

TABLE 2-2

| | mol fractions of chain end structures (% by mol) | | |
|---|---|---|---|
| | p-cumylphenoxy group | phenoxy group | hydroxyl group |
| Example 1 | 60 | 20 | 20 |
| Example 2 | 55 | 25 | 20 |
| Example 3 | 40 | 30 | 30 |
| Example 4 | 70 | 20 | 10 |
| Example 5 | 0 | 60 | 40 |
| Comparative Example 1 | 58 | 21 | 21 |
| Comparative Example 2 | 55 | 20 | 25 |
| Comparative Example 3 | 40 | 25 | 35 |
| Comparative Example 4 | 10 | 10 | 80 |

INDUSTRIAL APPLICABILITY

The polycarbonate of the present invention contains the unit of the phenyl salicylate structure in the main chain only in a small amount, exhibits excellent fluidity and moisture resistance, shows suppressed formation of cracks at high temperatures in high moisture, and are advantageously used in the optical field, the automobile field, and the mechanical field.

The polycarbonate can be efficiently produced by transesterification in the presence of a specific catalyst.

Figure 1:
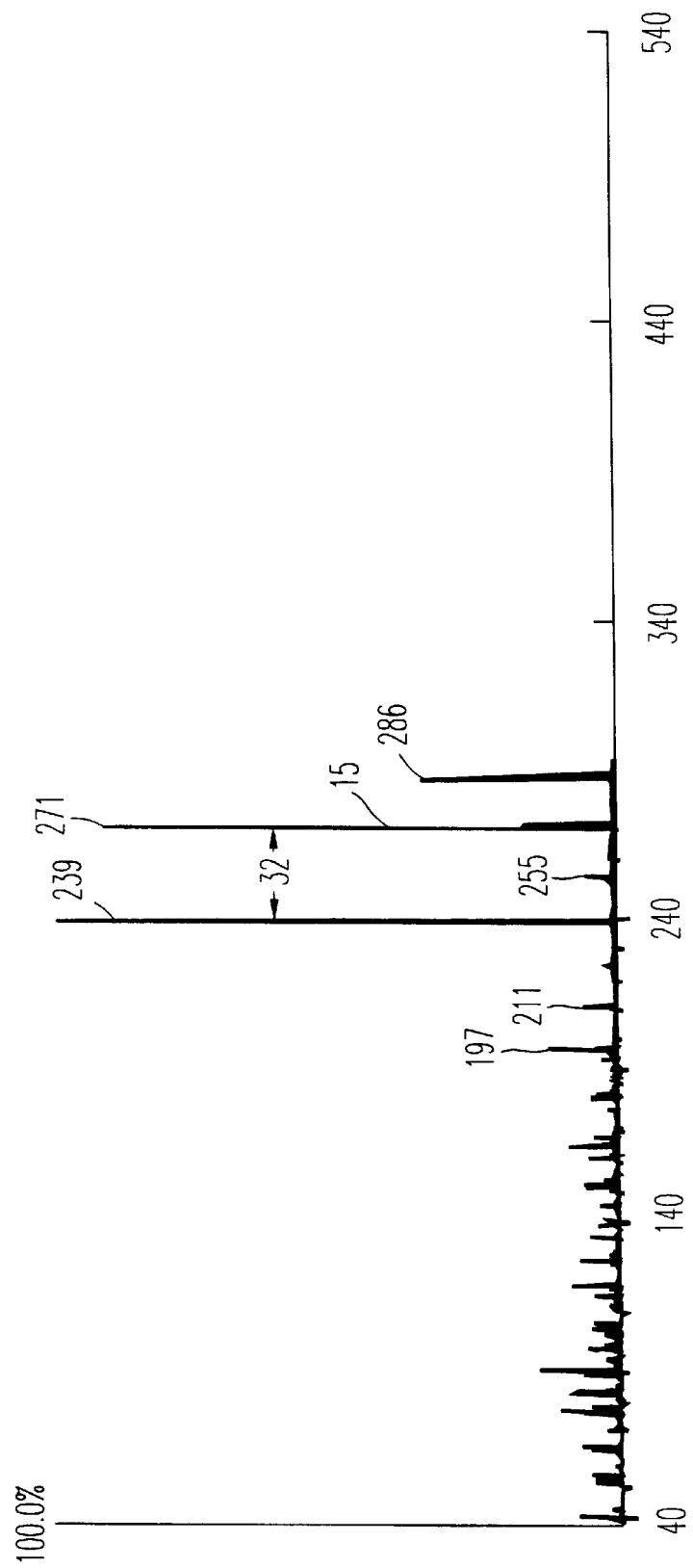
FIG. 1 shows a mass spectrum used in the qualitative analysis of the phenyl salicylate structure in the polymer obtained in Example 1.

We claim:

1. A polycarbonate which has a main chain comprising a repeating unit represented by general formula (I):

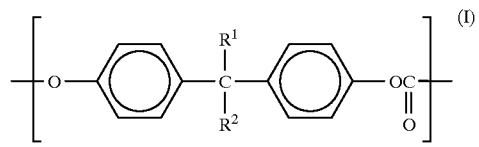

wherein $R^1$ and $R^2$ each represents hydrogen atom or an alkyl group having 1 to 7 carbon atoms, may be the same with or different from each other, and may be bonded to each other to form a ring structure; contains 100 ppm by weight or less of a unit of a phenyl salicylate structure expressed by formula (II):

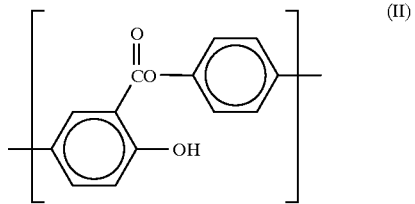

in the main chain; and has a viscosity-average molecular weight of 10,000 or more.

2. A polycarbonate according to claim 1, which comprises 5 to 98% by mol of p-cumylphenoxy group, 1 to 94% by mol of phenoxy group, and 1 to 94% by mol of hydroxyl group at the chain ends.

3. A polycarbonate according to any of claim 1, which is obtained by transesterification.

4. A process for producing a polycarbonate described in claim 1 which comprises transesterifying (A) an aromatic dihydroxy compound represented by general formula (III):

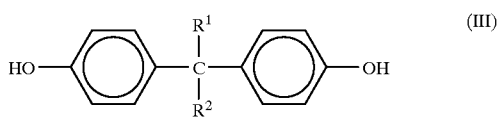

wherein $R^1$ and $R^2$ each represents hydrogen atom or an alkyl group having 1 to 7 carbon atoms, may be the same with or different from each other, and may be bonded to each other to form a ring structure, with (B) a diester of carbonic acid in the presence of a polymerization catalyst comprising a combination of (a) an organic basic compound containing nitrogen and (b) a quaternary phosphonium salt.

5. A process for producing a polycarbonate described in claim 2 which comprises transesterifying (A) an aromatic dihydroxy compound represented by general formula (III) with (B') diphenyl carbonate in the presence of p-cumylphenol and a polymerization catalyst comprising a combination of (a) an organic basic compound containing nitrogen and (b) a quaternary phosphonium salt.

6. A process according to claim 4 wherein the aromatic dihydroxy compound of component (A) is 2,2-bis(4-hydroxyphenyl)propane.

* * * * *